(12) United States Patent
Parizat et al.

(10) Patent No.: US 6,889,613 B2
(45) Date of Patent: May 10, 2005

(54) VARIABLE OUTPUT INFLATOR

(75) Inventors: Amnon Parizat, Old Westbury, NY (US); Marek Tarczynski, New York, NY (US)

(73) Assignee: Island Pyrochemical Industries Corp., Mineola, NY (US)

( * ) Notice: Subject to any disclaimer, the term of this patent is extended or adjusted under 35 U.S.C. 154(b) by 292 days.

(21) Appl. No.: 10/243,206

(22) Filed: Sep. 13, 2002

(65) Prior Publication Data

US 2004/0051287 A1 Mar. 18, 2004

(51) Int. Cl.⁷ ............................................... B60R 21/26
(52) U.S. Cl. ................... 102/530; 102/200; 102/202; 102/531; 280/736; 280/741; 280/742
(58) Field of Search ................ 102/200, 205, 102/530, 531, 702, 293, 202; 280/736, 741, 737, 740, 742, 728.1; 89/7

(56) References Cited

U.S. PATENT DOCUMENTS

| | | | | |
|---|---|---|---|---|
| 3,889,703 A | * | 6/1975 | Keathley | 137/67 |
| 5,060,973 A | * | 10/1991 | Giovanetti | 280/736 |
| 5,284,330 A | * | 2/1994 | Carlson et al. | 267/140.14 |
| 5,487,561 A | * | 1/1996 | Mandzy et al. | 280/741 |
| 5,639,117 A | * | 6/1997 | Mandzy et al. | 280/741 |
| 5,669,631 A | * | 9/1997 | Johnson et al. | 280/741 |
| 5,755,091 A | * | 5/1998 | Johnson | 60/204 |
| 5,806,884 A | * | 9/1998 | Johnson et al. | 280/736 |
| 5,829,784 A | * | 11/1998 | Brown et al. | 280/737 |
| 6,036,226 A | | 3/2000 | Brown et al. | |
| 6,039,347 A | | 3/2000 | Maynard | |
| 6,481,357 B1 | * | 11/2002 | Lindner et al. | 102/530 |
| 6,564,717 B2 | * | 5/2003 | Haerle et al. | 102/262 |
| 2004/0000777 A1 | * | 1/2004 | Meduvsky et al. | 280/742 |

FOREIGN PATENT DOCUMENTS

WO  WO 98/33684  * 8/1998

* cited by examiner

Primary Examiner—Michael J. Carone
Assistant Examiner—James S. Bergin
(74) Attorney, Agent, or Firm—Francis C. Hand; Carella, Byrne, Bain, et al.

(57) ABSTRACT

The variable output inflator includes an injection piston assembly containing a liquid propellant chamber from which liquid propellant is injected through one or more nozzles in the injection piston into a combustion chamber. The movement of the injection piston is controlled by a magnetic control unit employing an annular gap through which the MR fluid flows in a controlled manner. The inflator is of cylindrical type and may be made of small compact dimensions.

30 Claims, 2 Drawing Sheets

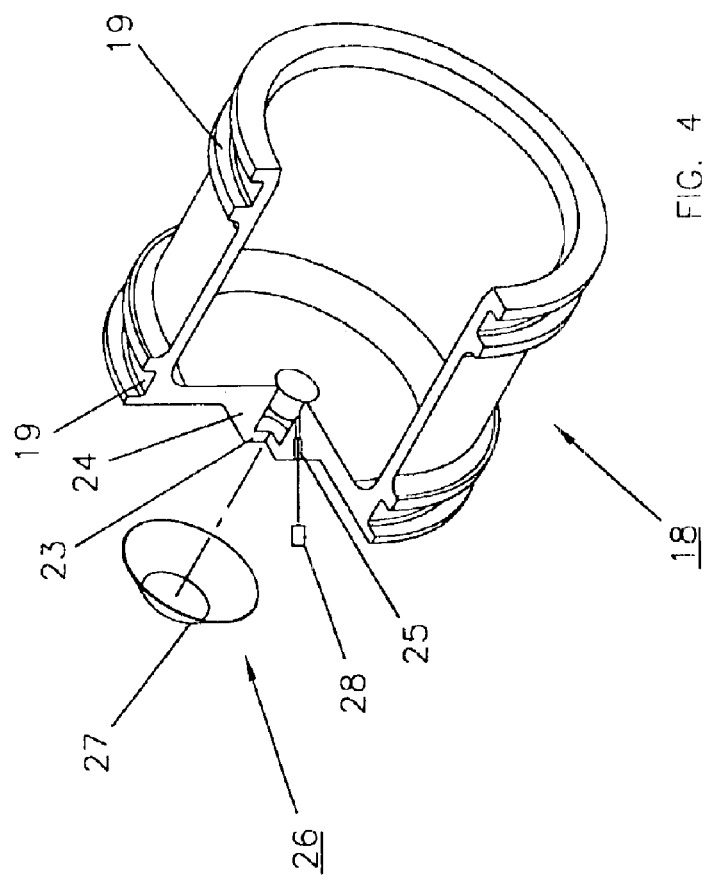
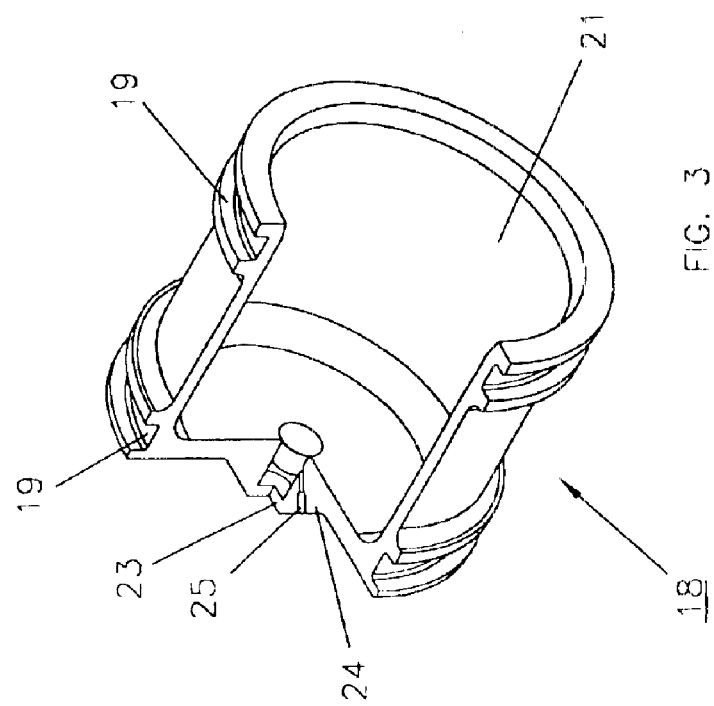

VARIABLE OUTPUT INFLATOR

This invention relates to a variable output inflator. More particularly, this invention relates to a variable output inflator for inflating air bags in vehicles As is known, various types of air bag inflators have been used for inflating air bags in vehicles such as automobiles in order to protect an occupant against injury. Typically, the inflators have been constructed to introduce an inflation gas into the air bag within a very short time period.

U.S. Pat. No. 6,036,226 describes an air bag inflator in which a liquid propellant is introduced into a combustion chamber at a controlled rate via a central opening in a piston in order to inflate an air bag. As described, use is made of a damping chamber filled with a magneto-rheological fluid that is pumped through an orifice during a regenerative pumping stroke of the piston to control the air bag inflation rate. To this end, an electromagnet is selectively energized to produce a varying magnetic field to adjust the viscosity of the magneto-rheological fluid flowing through the orifice and thus vary a damping force exerted on the piston stroke.

U.S. Pat. No. 5,669,631 describes an air bag inflator of a liquid propellant type in which a liquid propellant is introduced into a combustion chamber at a controlled rate in order to inflate one or more air bags. As described, the liquid propellant is passed from a reservoir into the combustion chamber by passing around an annular head of the piston through grooves in the wall of the cylinder housing the piston. U.S. Pat. No. 5,060,973 describes a further technique for inflating an air bag.

In many cases, the air bag inflators have been constructed in a manner such that the combustion process is sensitive to changes of ambient temperature.

It is an object of the invention to reduce the sensitivity of the combustion process of an air bag inflator to changes of ambient temperature.

It is another object of the invention to control the mass flow rate of a gas entering an air bag.

It is another object of the invention to enhance the combustion process of an inflator by operating in a non-steady mode.

It is another object of the invention to increase the de-powering characteristics of an inflator It is another object of the invention to provide a single inflator that is used to achieve a variable combustion time and thus air bag inflation.

Briefly, the invention is directed to a variable output inflator comprising an injection piston slidably mounted in a combustion chamber for movement between an initial position and a second position in response to the introduction of a combustion gas into the combustion chamber and a magnetic control unit for controlling movement of the injection piston from the first position to the second position.

The piston includes a propellant chamber for containing a charge of liquid propellant and means communicating the propellant chamber with the combustion chamber to deliver liquid propellant thereto.

The magnetic control unit includes a sleeve disposed coaxially of the injection piston, a core disposed in and concentrically spaced from the sleeve to define a gap therebetween to receive a flow of magneto-rheological fluid (hereinafter "MR fluid") in response to movement of the injection piston from the first position towards the second position, and at least one electromagnetic coil for producing an electromagnetic field across the gap to effect the rheological properties of the MR fluid in the gap whereby an increase in the electromagnetic field effects an increase in the flow resistance of the MR fluid in the gap to slow the movement of the injection piston.

As is known, the ability of MR fluid to change its rheological properties is a function of the magnetic field and the function of the composition of the fluid. The present inflator provides a method of increasing the apparent yield stress of the MR fluid by gap design. A variable gap width is used to increase the apparent yield stress of the MR fluid (i.e. an increase of the flow restrictions in the gap of the magnetic control unit). While a concentric gap is preferred, other gaps may be used such as a variable diameter gap or a variable width gap. In this respect, any construction that would force the MR fluid through a diminishing thickness area would increase the apparent yield stress of the MR fluid The magnetic field in the gap is critical to achieve full potential of flow control. The magnetic field is extremely sensitive to changes in gap geometry. Therefore, it is critical to generate magnetic fields that exceed certain prescribed values throughout the entire length of a gap of variable width. This is possible by use of multiple electric coils of various numbers of turns distributed inversely proportional to the gap width. The variable output inflator may be made of a small size to be used in various applications requiring small size and performance tuned to multiple needs of a modern automobile. Typical applications include side, thorax, window curtain, air bags and the like.

In one embodiment, the gap of the magnetic control unit has a decreasing thickness in a direction away from the injection piston. Thus, for a given electromagnetic field along the gap, the yield stress of the MR fluid is varied inversely.

The inflator also has a housing defining the combustion chamber and having at least one port for expelling combustion gas from the combustion chamber as well as an initiator mounted on the housing for introducing a combustion gas into the combustion chamber.

The injection piston is slidably mounted in the combustion chamber for movement in response to the introduction of a combustion gas into the combustion chamber. The means in the piston that communicates the propellant chamber with the combustion chamber includes at least one nozzle communicating the propellant chamber with the combustion chamber to deliver liquid propellant thereto. In addition, means are provided for releaseably closing the nozzle to prevent communication between the propellant chamber and the combustion chamber. This latter means includes a tape secured to the injection piston over the nozzle on a side facing the combustion chamber to prevent a flow of combustion gas from the combustion chamber through the nozzle during startup Typically, the tape is a thin metal tape, for example, being made of aluminum. This means also includes a plug fitted into the nozzle which is expellable from the nozzle into the combustion chamber in response to a pressurized flow of liquid propellant from the propellant chamber into the combustion chamber. Typically, the plug is made of nylon.

A pump piston may also be slidably mounted within the injection piston to close off the propellant chamber. During use, the pump piston is held stationary, for example by means of a plug mounted in the housing coaxially of the piston and which slidably receives the piston. As the injection piston moves toward the pump piston, the liquid propellant in the propellant chamber is placed under a pressure which is greater than the pressure of the combustion gas in the combustion chamber. Due to the differential in pressures, the liquid propellant is expelled through the injection nozzle.

The core of the magnetic control unit also has an internal bore and a plurality of grooves in one end that communicate the gap with the bore in order to convey the MR fluid from the gap to the bore in response to movement of the injection piston over the plug. A closure plate is also provided within the housing to abut the sleeve and core at one end to thereby close off the housing at that end. A piston is also slidably mounted in the bore for movement from a first position adjacent the closure plate to a position remote from the closure plate in response to the MR fluid filling of the bore.

As can be demonstrated, regenerative combustion devices equipped with magnetorheological control have a limit for the minimum steady state combustion pressure. Theoretical calculations for ideal conditions indicate that the minimum pressure at which stable combustion is possible is equal to one-half of the maximum combustion pressure. The actual limit for minimum steady state combustion pressure is even higher, for example, about 70%, significantly limiting the depowering characteristics of the inflator.

The present invention provides an enhanced combustion control, that is, operation at pressures below the theoretical steady state conditions. This is achieved by operation in a non-steady mode. In this mode, excessive back pressure that would cause the combustion to extinguish is applied but is removed before the actual extinguishment When the combustion process is reestablished, the excessive back pressure is again applied. Operating the inflator with saw-like back pressure with the peaks exceeding the steady-state condition makes it possible to increase the de-powering characteristics of the inflator.

Combustion control of the regenerative combustion inflator is achieved by the application of back pressure that controls the injection process. This back pressure is generated by flow restrictions of the MR fluid flowing through the narrow gap between the sleeve and the core with a controlled magnetic field.

The inflator maybe used as a single unit that can achieve variable combustion (bag inflation) time That is to say, the combustion in time can be adjusted to accommodate the specific needs of the particular air bag without changing the dimensions of the inflator or the propellant charge. The adjustments are achieved by varying the dimensions of the injector nozzles and exhaust ports.

These and other objects of the invention will become more apparent from the following detailed description taken in conjunction with the accompanying drawings wherein:

FIG. 3 illustrates a part perceptive view of an injection piston used in the inflator of FIG. 1; and FIG. 4 illustrates an exploded perceptive view of an injection piston assembly constructed in accordance with the invention.

Figure 1:
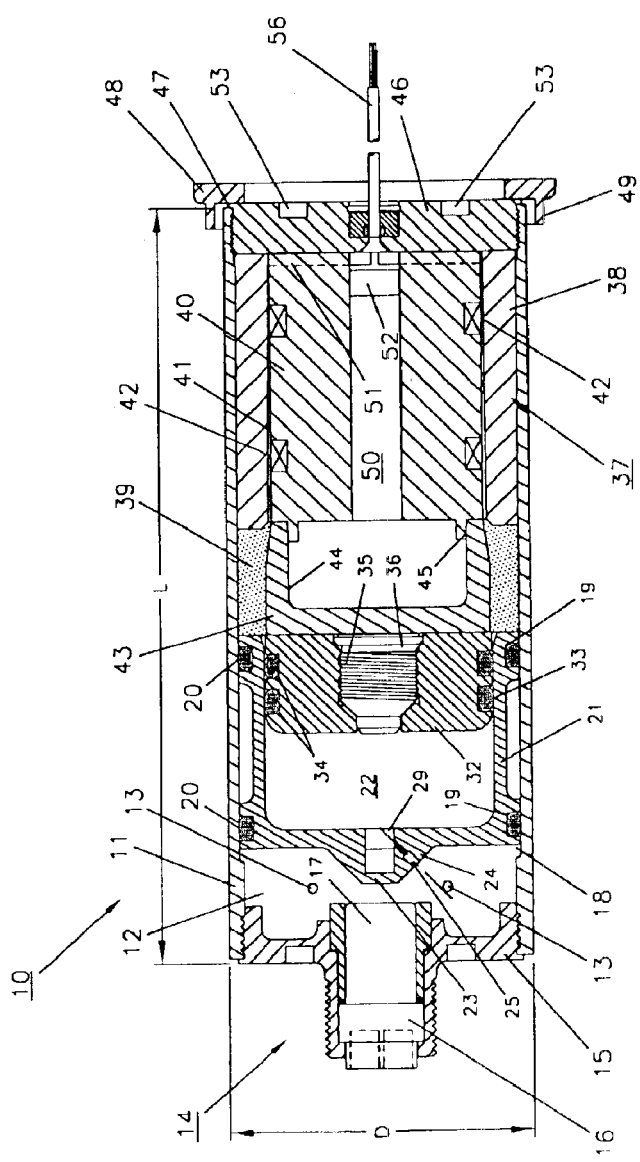
FIG. 1 illustrates a cross-sectional view of a variable output inflator constructed in accordance with the invention.

Referring to FIG. 1, the air bag inflator 10 includes a housing 11 in a form of a cylindrical barrel that defines a combustion chamber 12 and that has at least one exhaust port 13 for expelling gas from the combustion chamber 12.

In addition, the inflator 10 has an initiator assembly 14 threadably mounted in one end of the housing 11 for introducing a combustion gas into the combustion chamber 12. The initiator assembly 14 is of conventional structure and includes a threaded plug 15 that threads into the housing 11, an initiator of conventional structure 16 within the plug 15 and an annular retainer 17 that retains the initiator 16 in place.

Upon actuation, the initiator 16 delivers a stream of hot combustion gases into the combustion chamber 12.

The inflator 10 also has an injection piston assembly including an injection piston 18 slidably mounted in the combustion chamber of the housing 11 for movement between an initial position, as shown, and a second retracted position, (not shown) in response to the introduction of a combustion gas from the initiator 16 into the combustion chamber 12. Typically, the injection piston 18 is of cylindrical cross section to fit within a cylindrical cross section of the housing 11. In addition, a pair of annular spaced apart grooves 19 are provided in the injection piston 18 to receive a seal ring 20, such as an O-ring, in each in order to seal the space between the injection piston 18 and the housing 11 against a flow of combustion gas from the combustion chamber 11.

The injection piston 18 has a circumferential skirt 21 that defines a propellant chamber 22 for containing a charge of liquid propellant. For example, the liquid propellant is a hydroxyl ammonium nitrate based liquid monopropellant including hydroxyl ammonium nitrate, triethyl ammonium nitrate and water having 56% by weight hydroxyl ammonium nitrate as an oxidizer, 19% by weight triethyl ammonium nitrate as fuel and at least 20% by weight water as a diluent to provide stability of the propellant.

In addition, the injection piston 18 has a nose 23 projecting into the combustion chamber 12. The nose 23 includes a conically shaped section 24 that extends towards the skirt 21.

Figure 2:
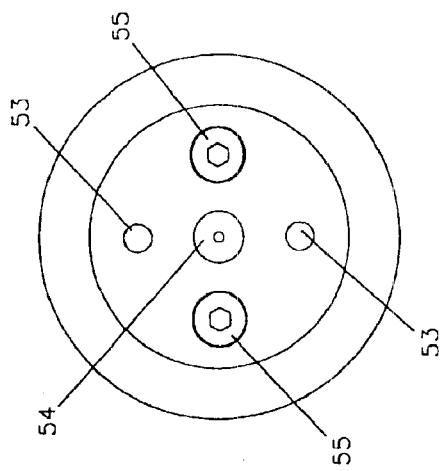
FIG. 2 illustrates an end view of the inflator of FIG. 1.

Referring to FIGS. 2 and 3, the injection piston 18 has a plurality of nozzles 25 (only one of which is shown) within the conically shaped section 24 that communicates the propellant chamber 22 with the combustion chamber in order to deliver liquid propellant thereto angularly of the axis of the piston 18. A means 26 (see FIG. 4) is also provided for releasably closing each nozzle 25 in order to prevent communication between the propellant chamber 22 and the combustion chamber. As illustrated, this means 26 includes a tape 27 secured to the injection piston 18 over the nozzle 25 on a side facing the combustion chamber to prevent a flow of combustion gas from the combustion chamber into the nozzle 25 during startup. In addition, this means 26 includes a plug 28 fitted into the nozzle 25. This plug 28 is expellable from the nozzle 25 into the combustion chamber in response to a pressurized flow of liquid propellant from the propellant chamber as described below.

The nozzles 25 are disposed in an equi-spaced manner about the circumference of the conically shaped section 24 of the injection piston 18. In this embodiment, a conically shaped tape 27 (see FIG. 4) is secured to the conical section 24 of the injection piston over the nozzles 25

The tape 27 that is used is a thin metal tape and is preferably made of aluminum. The plug 28 that is fitted into each nozzle is typically made of plastic, such as a Nylon. The Nylon plug 28 and thin metal tape 27 act as a check valve to protect the propellant in the propellant chamber 22 against flash back during startup. When a steady pressure differential between the propellant chamber and the combustion chamber is established, the tape 27 is burned and is otherwise consumed, at the same time, the plastic plug 28 is blown into the combustion chamber and the process of propellant injection into the combustion chamber is established.

Each nozzle 25 is constructed with a diameter and length selected to reduce viscous losses and prevent flash back. The nozzle diameter to achieve proper droplet distribution and size is 0.5 to 1.2 millimeters and preferably 0.85 millimeters. The length to diameter ratio to prevent flash back is between 2.0 to 4–5 and preferably 3.8. The nozzle design is such as to reduce the sensitivity of the combustion process to changes in ambient temperature.

The nozzles 25 thus provide a relatively simple structure for controlling the flow of liquid propellant out of the propellant reservoir 22 into the combustion chamber 12.

Referring to FIG. 1, an injection plug 29 is slidably mounted in the nose 23 of the injection piston 18 to move from a first position, as shown, blocking communication between the propellant chamber 23 and the nozzle 25 to a second position, not shown, to permit communication between the propellant chamber 22 and the nozzle 25 in response to a pressurized flow of liquid propellant from the propellant chamber 22. The injection plug 29 has a shoulder (not shown) facing the propellant chamber 22 that rests within a recess (not shown) of the injection piston 18. When the pressure of the liquid propellant reaches a certain level within the propellant chamber 22, the shoulder is sheared off thereby allowing the remainder of the plug to move forwardly in order to expose the nozzles 25. At this time, the injection of the propellant into the combustion chamber 11 begins. The plug 29 also protects the propellant in the propellant chamber 22 against contact with the hot gas from the combustion chamber 12 until flow of propellant is established.

Alternatively, the injection plug 29 may be of cylindrical shape and held in place by a friction force between the plug 29 and the bore of the nose 23 of the injection piston 18. When the pressure in the propellant chamber 22 exceeds the prescribed value, the force acting on the plug 29 overcomes the friction force to push the plug 29 forwardly.

As an alternative to using the plug within the nozzle, a rupturable disc (not shown) may be welded or otherwise fixed over the nozzle port. When the pressure in the propellant chamber 22 exceeds the prescribed value, the disc would rupture thereby opening the nozzle to start the injection of the propellant into the combustion chamber.

Referring to FIG. 1, a pump piston 32 is slidably mounted within the skirt 21 of the injection piston 18 in order to close off the propellant chamber 22 to complete the injection piston assembly. As indicated, the pump piston 32 is provided with a pair of annular grooves 33 to receive a seal ring 34, such as an O-ring, in each to seal the space between the pump piston 32 and the annular skirt 21 of the injection piston 18. In addition, the pump piston 32 has an internally threaded bore 35 into which a threaded plug 36 is mounted. The threaded bore 35 provides for access into the propellant chamber 22 in order to fill the chamber with a suitable liquid propellant. The plug 36 serves to close off the bore 35 after filling of the reservoir chamber.

The inflator 10 is connected to a central processing unit (CPU) (not shown) so that the initiator 16 is able to receive a signal for initiation of the operation of the inflator 10. The CPU is, in turn, connected to one or more sensors within the vehicle in order to receive signals therefrom indicative of various circumstances. Based upon the received signals, the CPU operates in a conventional manner in order to actuate the initiator 16 to begin inflation of an air bag or air bags (not shown).

Referring to FIG. 1, a magnetic control unit 37 for controlling the movement of the injection piston 18 includes a sleeve 38 slidably mounted within the housing 11 coaxially of the injection piston 18 to define a chamber 39 therebetween for receiving a magneto-rheological fluid (hereinafter "MR fluid"). The magnetic control unit 37 also has a core 40 disposed in and concentrically spaced from the sleeve 38 to define a gap 41 therebetween communicating with the chamber (reservoir) 39 containing the MR fluid. In addition, a pair of electromagnetic coils 42 are mounted on the core 40 for producing an electromagnetic field across the gap in order to affect the rheological properties of the MR fluid in the gap whereby an increase in the electromagnetic field effects (causes) an increase in the flow resistance of the MR fluid in the gap to slow the movement of the injection piston 18.

In accordance with the invention, each magnetic coil 42 may be constructed differently from the other in order to create a different strength magnetic field across the gap 41. Also, different signals may be delivered to each coil 42 in order to establish fields of different strength across the gap. Suitable means (not shown) are provided to connect the electromagnetic coils 42 to a suitable voltage source. In this way, the flow of MR fluid may be controlled through the gap thereby controlling the movement of the injection piston 18.

A plug 43 is disposed between the core 40 and the pump piston 32 to act as a spacer and MR fluid collector and to further define the chamber 39 to receive the MR fluid. This plug 43 is of cup shape to define a recess 44. In addition, the plug 43 has an outer diameter that allows the skirt 21 of the injection piston 18 to slide thereon during movement of the injection piston 18 towards the sleeve 38. As indicated, the peripheral surface of the plug 43 nearest the sleeve 38 is conically tapered inwardly in order to provide a path for the MR fluid into the gap 41 between the sleeve 38 and core 40.

The core 40 has an annular shoulder or lip 45 that projects into the recess 44 of the plug 43 so that the plug 43 is centered relative to the core 40 and pump piston 32.

A closure plate 46 is also mounted within the housing 11 to abut the sleeve 38 and core 40 at one end. As indicated, the closure plate 46 is threaded into the housing 11 and abutted against an internal shoulder 47 of the housing 11.

The core 40 is also provided with a central bore 50 that communicates with the gap 41 via radially disposed grooves 51 in the end wall of the core 40 or in the closure plate 46. This allows MR fluid to be conveyed from the chamber 39 to the bore 50 and plug 43 in response to movement of the injection piston 18 over the plug 43.

A piston 52 is slidably mounted in the bore 50 of the core 40 for movement between a first position, as illustrated, adjacent the closure plate 46 to a position removed from the closure plate 46 in response to the MR fluid filling the bore 50.

As shown if FIGS. 1 and 2, the closure plate 46 is provided with a pair of diametrically opposed recesses 53 to permit a wrench or other type of tool to be inserted for rotating the closure plate 46 within the housing 11.

In operation, when a signal is received from a suitable sensor or source, the initiator 16 is activated to introduce hot combustion gasses into the combustion chamber 12. As the gases fill and pressurize the combustion chamber 12, the injection piston 18 is pushed to the right, as viewed, so that the annular skirt 21 of the injection piston 18 slides over the pump piston 32 as well as over the plug 43 This, in turn, pressurizes the liquid propellant within the propellant chamber 22 while also pressurizing the MR fluid in the reservoir 39 causing the MR fluid to pass through the gap 41 between the sleeve 38 and core 40.

When the pressure of the liquid propellant exceeds a prescribed value, the injection plug 29 in the injection piston 18 is pushed to the left, as viewed, thereby exposing the nozzles 25 to the pressurized propellant. Next, as the liquid propellant traverses each nozzle 25, the plug 28 therein (see FIG. 2) blows through the tape 27 and into the combustion chamber 12. The liquid propellant is then ignited by the hot gasses in the combustion chamber 12 so that there is a further buildup of pressure within the combustion chamber 12. This, in turn, causes the injection piston 18 to move further to the right over the pump piston 32 and into the MR fluid reservoir 39 thereby expelling further liquid propellant into the combustion chamber 22 and additional MR fluid into the gap 41. As the combustion gases fill the combustion chamber 12, the gasses begin to pass through the exhaust port 13 to an air bag in a conventional manner. The exhaust ports 13 are initially closed by means of stainless steel tape of prescribed thickness that open gradually. A gradual opening of the exhaust ports 13 prevents extinguishment of the combustion during start up and controls the mass flow rate of the gas entering the air bag. Gradual opening of the exhaust ports 13 may be achieved by the use of rupture tapes of various thicknesses that rupture sequentially at various pressures.

Alternatively, use may be made of the movement of the piston to control the opening of the exhaust ports 13.

The exhaust ports 13 in the housing 11 may be staggered along the length of the housing 11 and along the length of the injection piston 18 so that as the piston 18 moves to the right, as indicated in FIG. 1, the ports 13 are sequentially exposed to allow a controlled outflow of the combustion gases.

During the time that the MR fluid passes from the reservoir 39 into the gap 41 between the sleeve 38 and core 40, a signal is applied to the magnetic coils 42 from a suitable source, such as the CPU, in order to control the amount of damping of the injection piston 18.

The electromagnetic coils 42 may be energized in a non-steady mode. In this respect, the MR fluid controlled regenerative combustion devices have a limit for the minimum steady state combustion pressure. Theoretical calculations for ideal conditions indicate that the minimum pressure at which stable combustion is possible is equal to one-half of the maximum combustion pressure. The actual limit for minimum steady state combustion pressure is even higher (about 70%), significantly limiting the de-powering characteristics of the inflator.

Providing an enhanced combustion control, that is, operation at pressures below the theoretical steady state conditions, is achieved by operation in a non-steady mode. That is to say, excessive back pressure that would cause the combustion to extinguish is first applied but then removed before the actual extinguishment. When the combustion process reestablishes itself, excessive back pressure is again applied. Operating the electromagnetic coils 42 so that a saw-like back pressure pattern is obtained with peaks exceeding the steady-state condition makes it possible to increase the de-powering characteristics of the inflator 10.

The invention thus provides an inflator, which can be made of relatively small sizes to be used for various applications requiring small size. Further, the invention provides an inflator, which may be programmed and tuned to the multiple needs of a modern vehicle. For example, the inflator can be constructed to be operational in a temperature range of from −40° to +90°. The inflator is particularly operational in this temperature range with very little performance variation and dependency on temperature The inflator may be used with air bags intended for the side of a vehicle, the thorax of an occupant, window curtain air bags and the like.

Further, the invention provides a single inflator that can be used to achieve variable combustion time and therefore variable bag inflation time. The combustion time can be adjusted to accommodate the specific needs of the particular air bag without changing the inflated dimensions and propellant charge. This change is achieved by varying the dimensions of the injector nozzles and exhaust ports.

What is claimed is:

1. A variable output inflator comprising
a housing having a combustion chamber therein and at least one port for expelling combustion gas from said combustion chamber;
an initiator mounted on said housing for introducing a combustion gas into said combustion chamber;
an injection piston slidably mounted in said combustion chamber of said housing for movement between an initial position and a second position in response to the introduction of a combustion gas into said combustion chamber from said initiator, said piston including a propellant chamber therein for containing a charge of liquid propellant therein and means communicating said propellant chamber with said combustion chamber to deliver liquid propellant thereto; and
a magnetic control unit for controlling movement of said injection piston from said first position to said second position, said magnetic control unit including a sleeve within said housing coaxially of said injection piston to define a third chamber therebetween for receiving a magneto-rheological fluid, a core disposed in and concentrically spaced from said sleeve to define a gap therebetween communicating with said third chamber, and at least one electromagnetic coil for producing an electromagnetic field across said gap to affect the rheological properties of the magneto-rheological fluid in said gap whereby an increase in the electromagnetic field effects an increase in the flow resistance of the magneto-rheological fluid in said gap to slow the movement of said injection piston.

2. An inflator as set forth in claim 1 wherein said sleeve and said core define a gap of decreasing thickness in a direction away from said third chamber.

3. An inflator as set forth in claim 1 comprising a pair of said electromagnetic coils disposed in spaced apart relation along said gap to produce a different electromagnetic field across said gap.

4. A variable output inflator comprising
a housing having a combustion chamber therein and at least one port for expelling combustion gas from said combustion chamber;
an initiator mounted on said housing for introducing a combustion gas into said combustion chamber;
an injection piston slidably mounted in said combustion chamber of said housing for movement between an initial position and an expelled position in response to the introduction of a combustion gas into said combustion chamber from said initiator, said piston including a propellant chamber therein for containing a charge of liquid propellant therein, at least one nozzle communicating said propellant chamber with said combustion chamber to deliver liquid propellant thereto, and means for releaseably closing said nozzle to prevent communication between said propellant chamber and said combustion chamber;
a plug mounted in said housing coaxially of said piston to slidably receive said piston; and
a magnetic control unit for controlling movement of said injection piston relative to said plug.

5. A inflator as set forth in claim 4 wherein said magnetic control unit includes a sleeve within said housing coaxially of said injection piston to define a third chamber therebetween for receiving a magneto-rheological fluid, a core disposed in and concentrically spaced from said sleeve to define a gap therebetween communicating with said third chamber, and at least one electromagnetic coil for producing an electromagnetic field across said gap to affect the rheological properties of the magneto-rheological fluid in said gap whereby an increase in the electromagnetic field effects an increase in the flow resistance of the magneto-rheological fluid in said gap to slow the movement of said injection piston.

6. A inflator as set forth in claim 5 wherein said core has an internal bore and a plurality of grooves in one end thereof communicating said gap with said bore to convey the magneto-rheological fluid from said third chamber to said bore in response to movement of said injection piston over said plug.

7. A inflator as set forth in claim 6 which further comprises a closure plate within said housing abutting said sleeve and said core at one end thereof, and a piston slidably mounted in said bore for movement from a first position adjacent said closure plate to a position remote from said closure plate in response to the magneto-rheological fluid filling said bore.

8. An inflator as set forth in claim 4 wherein said means for releaseably closing said nozzle includes a tape secured to said injection piston over said nozzle on a side facing said combustion chamber to prevent a flow of combustion gas from said combustion chamber through said nozzle during startup.

9. An inflator as set forth in claim 8 wherein said tape is a metal tape.

10. An inflator as set forth in claim 9 wherein said tape is made of aluminum.

11. An inflator as set forth in claim 8 wherein said means for releaseably closing said nozzle further includes a plug fitted into said nozzle, said plug being expellable from said nozzle into said combustion chamber in response to a pressurized flow of liquid propellant from said propellant chamber.

12. An inflator as set forth in claim 11 wherein said plug in said nozzle is made of Nylon.

13. An inflator as set forth in claim 4 wherein said injection piston is made of metal and which further comprises a coating on said injection piston within said propellant chamber to prevent contact between a liquid propellant in said propellant chamber and said metal piston.

14. An inflator as set forth in claim 13 wherein said coating is made of a polytetrafluoroethylene plastic.

15. An inflator as set forth in claim 4 wherein said injection piston has a nose projecting into said combustion chamber and having a conically shaped section and wherein said nozzle has an outlet located in said conically shaped section.

16. An inflator as set forth in claim 15 wherein injection piston has a plurality of said nozzles in said conically shaped section and said means includes a conically shaped tape secured to said conically shaped section over said nozzles.

17. An inflator as set forth in claim 15 which further comprises an injection plug slidably mounted in said nose to move from a first position blocking communication between said propellant chamber and said nozzle to a second position to permit communication between said propellant chamber and said nozzle in response to a pressurized flow of liquid propellant from said propellant chamber.

18. An inflator as set forth in claim 4 wherein said injection piston has a circumferential skirt defining said propellant chamber and further comprising a pump piston mounted in abutment with one end of said plug and slidably receiving said skirt of said injection piston thereon.

19. An inflator comprising
a cylindrical housing having a combustion chamber therein and at least one exhaust port for expelling combustion gas from said combustion chamber;
an initiator mounted on one end of said housing for introducing a combustion gas into said combustion chamber;
an injection piston slidably mounted in said combustion chamber of said housing for movement between an initial position and an expelled position in response to the introduction of a combustion gas into said combustion chamber from said initiator, said piston including a propellant chamber therein for containing a charge of liquid propellant therein, at least one nozzle communicating said propellant chamber with said combustion chamber to deliver liquid propellant thereto, and means for releaseably closing said nozzle to prevent communication between said propellant chamber and said combustion chamber;
a plug mounted in said housing on an opposite side of said injection piston from said initiator and coaxially of said piston to slidably receive said piston; and
a magnetic control unit for controlling movement of said injection piston relative to said plug.

20. An inflator as set forth in claim 19 wherein said magnetic control unit includes a sleeve within said housing coaxially of said injection piston to define a third chamber therebetween for receiving a magneto-rheological fluid, a core disposed in and concentrically spaced from said sleeve to define a gap therebetween communicating with said third chamber, and at least one electromagnetic coil for producing an electromagnetic field across said gap to affect the rheological properties of the magneto-rheological fluid in said gap whereby an increase in the electromagnetic field effects an increase in the flow resistance of the magneto-rheological fluid in said gap to slow the movement of said injection piston.

21. An inflator as set forth in claim 20 wherein said core has an internal bore and a plurality of grooves in one end thereof communicating said gap with said bore to convey the magneto-rheological fluid from said third chamber to said bore in response to movement of said injection piston over said plug.

22. An inflator as set forth in claim 19 wherein said means includes a tape secured to said injection piston over said nozzle on a side facing said combustion chamber to prevent a flow of combustion gas from said combustion chamber through said nozzle during startup.

23. An inflator as set forth in claim 22 wherein said means further includes a plug fitted into said nozzle, said plug being expellable from said nozzle into said combustion chamber in response to a pressurized flow of liquid propellant from said propellant chamber.

24. An inflator as set forth in claim 19 wherein said injection piston is made of metal and which further comprises a coating on said injection piston within said propellant chamber to prevent contact between a liquid propellant in said propellant chamber and said metal piston.

25. An inflator as set forth in claim 19 wherein said injection piston has a nose projecting into said combustion chamber and having a conically shaped section and wherein said nozzle has an outlet located in said conically shaped section.

26. An inflator as set forth in claim 25 wherein injection piston has a plurality of said nozzles in said conically shaped section and said means includes a conically shaped tape secured to said conically shaped section over said nozzles.

27. An inflator as set forth in claim 25 which further comprises an injection plug slidably mounted in said nose to move from a first position blocking communication between said propellant chamber and said nozzle to a second position to permit communication between said propellant chamber and said nozzle in response to a pressurized flow of liquid propellant from said propellant chamber.

28. An inflator as set forth in claim 19 further comprising a second piston mounted in abutment with one end of said plug and slidably receiving said injection piston thereon to pressurize liquid propellant in said propellant chamber in response to sliding of said injection piston onto said second piston.

29. An inflator as set forth in claim 28 wherein said second piston is made of plastic.

30. An inflator comprising a cylindrical housing having a combustion chamber therein and at least one exhaust port for expelling combustion gas from said combustion chamber;

an initiator mounted on one end of said housing for introducing a combustion gas into said combustion chamber;

an injection piston slidably mounted in said combustion chamber of said housing for movement between an initial position and an expelled position in response to the introduction of a combustion gas into said combustion chamber from said initiator, said piston including a propellant chamber therein for containing a charge of liquid propellant therein, at least one nozzle communicating said propellant chamber with said combustion chamber to deliver liquid propellant thereto, and means for releaseably closing said nozzle to prevent communication between said propellant chamber and said combustion chamber;

a plug mounted in said housing on an opposite side of said injection piston from said initiator and coaxially of said piston in spaced relation to said housing to define a chamber for receiving a magneto-rheological fluid and to slidably receive said piston; and a magnetic control unit for affecting the rheological properties of the fluid in said chamber to control the movement of said injection piston relative to said plug into said chamber.

* * * * *